United States Patent
Ji

(10) Patent No.: US 9,470,581 B2
(45) Date of Patent: Oct. 18, 2016

(54) APPARATUS AND METHOD OF DETECTING TEMPERATURE AND APPARATUS FOR PROCESSING SUBSTRATE

(71) Applicant: AP SYSTEMS INC., Hwaseong-Si, Gyeonggi-Do (KR)

(72) Inventor: Sang Hyun Ji, Yongin-Si (KR)

(73) Assignee: AP SYSTEMS INC. (KR)

( * ) Notice: Subject to any disclaimer, the term of this patent is extended or adjusted under 35 U.S.C. 154(b) by 175 days.

(21) Appl. No.: 14/190,084

(22) Filed: Feb. 25, 2014

(65) Prior Publication Data

US 2014/0284316 A1    Sep. 25, 2014

(30) Foreign Application Priority Data

Mar. 19, 2013   (KR) ......................... 10-2013-0029087

(51) Int. Cl.
*F27D 11/00*   (2006.01)
*G01J 5/60*   (2006.01)
(Continued)

(52) U.S. Cl.
CPC .............. *G01J 5/602* (2013.01); *G01J 5/0007* (2013.01); *G01J 2005/0048* (2013.01); *G01J 2005/067* (2013.01)

(58) Field of Classification Search
CPC .................... G01J 5/0007; G01J 5/602; G01J 2005/0048; G01J 2005/067; H01L 21/02244; H01L 21/67098; H01L 21/02238; H01L 21/67109; H01L 21/67248; H01L 21/67115; H01J 37/185; H01J 37/3171; H01J 2237/24585; H01J 2237/184; H01J 2237/2001; H01J 2237/006
See application file for complete search history.

(56) References Cited

U.S. PATENT DOCUMENTS

2011/0291030 A1* 12/2011 Lee ....................... H01J 37/185
250/492.21
2012/0310578 A1    12/2012 Solheim

FOREIGN PATENT DOCUMENTS

CN    201653581 U    11/2010
CN    102711605 A    10/2012
(Continued)

OTHER PUBLICATIONS

Dai, Shao-sheng et al., "Study on temperature drift compensation of infrared thermal imaging system," Journal of Chongqing University of Posts and Telecommunications (Natural Science Edition), vol. 24, No. 1, Feb. 2012, pp. 69-72.
(Continued)

*Primary Examiner* — Shawntina Fuqua

(57) ABSTRACT

Disclosed are an apparatus and method of detecting a temperature through a pyrometer in a non-contact manner, and an apparatus for processing a substrate using the apparatus, and more particularly, an apparatus and method of detecting a temperature, which precisely measures a temperature without any effect by humidity, and an apparatus for processing a substrate using the same. In an exemplary embodiment, an apparatus for detecting a temperature includes a humidity sensor configured to measure a humidity value, a temperature compensation database configured to store a temperature compensation value for each humidity value, and a pyrometer providing a non-contact temperature calculated by adding a temperature compensation value corresponding to a humidity value detected by the humidity sensor to a temperature to be compensated, which is obtained by converting a measured a wavelength intensity of a radiation radiated from an object in a wavelength band to be compensated.

5 Claims, 6 Drawing Sheets

(51) Int. Cl.
  *G01J 5/00*  (2006.01)
  *G01J 5/06*  (2006.01)

(56) References Cited

FOREIGN PATENT DOCUMENTS

| JP | 2134522 | | 5/1990 |
|---|---|---|---|
| JP | 5198652 | | 8/1993 |
| JP | 8261840 | * | 10/1995 |
| JP | 8261840 | | 10/1996 |
| JP | 9304187 | | 11/1997 |
| JP | 2004186300 | | 7/2004 |
| KR | 2009130659 A | | 12/2009 |

OTHER PUBLICATIONS

Manney, Gloria L. et al., "Wave Number Spectra From Temperature-Humidity Infrared Radiometer 61-m Water Vapor Data," Journal of Geophysical Research, vol. 95, No. D1, Jan. 20, 1990, pp. 909-913.

Yang, Zhen et al., "Calculation and error analysis of infrared temperature measurement using reflected temperature ,mmpensation," Optical Technique, vol. 34, Suppl. Dec. 2008, pp. 154-159.

* cited by examiner

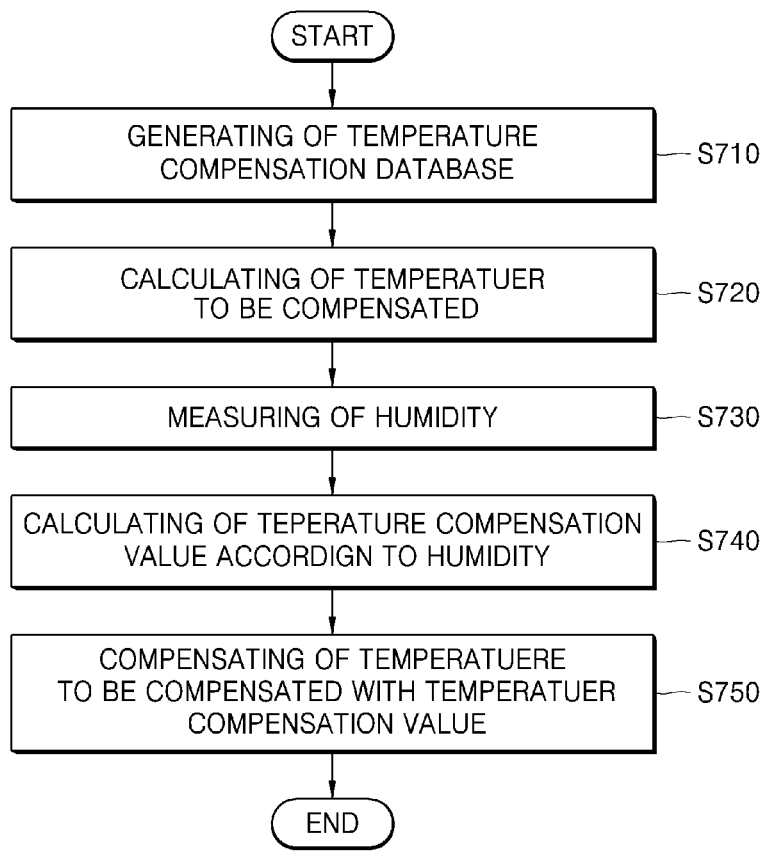

APPARATUS AND METHOD OF DETECTING TEMPERATURE AND APPARATUS FOR PROCESSING SUBSTRATE

CROSS-REFERENCE TO RELATED APPLICATION

This application claims priority to Korean Patent Application No. 10-2013-0029087 filed on Mar. 19, 2013 and all the benefits accruing therefrom under 35 U.S.C. §119, the contents of which are incorporated by reference in their entirety.

BACKGROUND

The present disclosure relates to an apparatus and method of detecting a temperature through a pyrometer in a non-contact manner, and an apparatus for processing a substrate using the apparatus, and more particularly, to an apparatus and method of detecting a temperature, which precisely measures a temperature without any effect by humidity, and an apparatus for processing a substrate using the same.

In a heat treatment apparatus which performs a heat treatment process with respect to a substrate, heat is supplied to a silicon substrate using a heating lamp such as a halogen lamp, and a temperature of the substrate is calculated through an optical probe, and the calculated temperature of the substrate is fed back to a heating controller so as to control the heating lamp.

FIG. 1 is a schematic view illustrating a low temperature heat treatment apparatus. As illustrated in FIG. 1, in a state in which a substrate 20 is installed at an edge ring 30 in a process chamber 10, a heat treatment is carried out by a plurality of heating lamps 61, and a temperature of the substrate 20 is measured by a long wavelength band measuring pyrometer 40 in a non-contact manner. Hereinafter, the pyrometer means a device which measures radiant energy having a long wavelength of approximately 5 μm to approximately 15 μm and converts it into a temperature, thereby calculating the temperature.

Therefore, the pyrometer 40 may concentrate the radiant energy radiated from the substrate 20 and having the long wavelength of approximately 5 μm to approximately 15 μm and a low temperature of approximately 600° C. or less through a lens 41 and then may calculate the temperature of the substrate in the non-contact manner, based on blackbody radiation temperature relationship. The temperature calculated by the pyrometer 40 is fed back to a heating part 60 through a heating controller 50 so as to control the temperature with respect to the plurality of heating lamps 61.

Meanwhile, the long wavelength of approximately 5 μm to approximately 15 μm generally has a property of being absorbed by moisture ($H_2O$). Therefore, if moisture of 100% is present at a light wavelength transmission area, a light wavelength of approximately 5 μm to approximately 7 μm is hardly transmitted, as illustrated in FIG. 2.

Therefore, the long wavelength radiated from the heating lamp 61 is input to the long wavelength measuring pyrometer through an inside of the process chamber 10, and a transmittance of the long wavelength input to the pyrometer is changed by the moisture ($H_2O$) present at the light transmission area.

For example, if moisture ($H_2O$) of 30% is present at the long wavelength transmission area, a transmittance of the light wavelength is 90%, and if moisture ($H_2O$) of 50% is present, a transmittance thereof is 60%, and if moisture ($H_2O$) of 70% is present, the light wavelength has a transmittance of less than 10%.

Therefore, the temperature measured by the pyrometer is changed according to the moisture ($H_2O$) present at the light transmission area. That is, an intensity value of the long wavelength radiant energy input to the pyrometer is changed due to a change in the long wavelength transmittance caused by a difference in the moisture ($H_2O$), and thus an error occurs in a converted temperature value of the pyrometer. Further, a pyrometer having a large diameter may be used in order to complement a low transmittance and receive a large quantity of light. However, in this case, since a size of the pyrometer becomes larger, increase of cost and difficulty in installation occurs, and also miniaturization of equipment is interrupted. That is, on the basis of a wavelength band of approximately 5 μm to approximately 15 μm, the quantity of light in a wavelength band of approximately 7 μm to approximately 15 μm is reduced to 60%, and thus a size of a pyrometer receiving only a wavelength band of approximately 7 μm to approximately 15 μm should be greater 1.7 times that of a pyrometer receiving the wavelength band of approximately 5 μm to approximately 15 μm.

RELATED TECHNICAL DOCUMENTS

Patent Documents (Patent document 1) Korean Patent Publication No.10-2009-0130659

SUMMARY

The present disclosure provides an apparatus and method of detecting a temperature, which precisely measures a temperature without any effect by humidity.

The present disclosure also provides an apparatus and method of detecting a temperature, which may miniaturize a pyrometer configured to measure a whole long wavelength band and calculated a temperature thereof.

The present disclosure also provides an apparatus for processing a substrate, which may precisely controls a temperature of a heating lamp without any effect by humidity.

In accordance with an exemplary embodiment, an apparatus for detecting a temperature includes a humidity sensor configured to measure a humidity value, a temperature compensation database configured to store a temperature compensation value for each humidity value, and a pyrometer in which, assuming that a wavelength band including a transmittance limiting wavelength band as a wavelength band having a transmittance less than a first threshold value due to the humidity and a transmittance allowing wavelength band as a wavelength band having a transmittance more than a second threshold value due to the humidity is a wavelength band to be compensated, a non-contact temperature is calculated by adding a temperature compensation value corresponding to a humidity value detected by the humidity sensor to a temperature to be compensated calculated by measuring a wavelength intensity of the wavelength band to be compensated radiated from an object to be measured.

Assuming that a temperature to be compensated is a temperature obtained by converting an intensity of the wavelength band to be compensated radiated from the object, and a transmittance allowing temperature is a temperature obtained by converting an intensity of the transmittance allowing wavelength band, a difference value between the transmittance allowing temperature and the temperature to be compensated may be regarded as a temperature compensation value for each humidity value and then stored in the temperature compensation database.

The transmittance limiting wavelength band may be a wavelength band having a transmittance of 10% or less at a humidity environment of 100%, and the transmittance allowing wavelength band may be a wavelength band having a transmittance of 90% or more at a humidity environment of 100%.

The transmittance limiting wavelength band may be a wavelength band of approximately 5 µm to approximately 7 µm, and the transmittance allowing wavelength band may be a wavelength band of approximately 7 µm to approximately 15 µm, and the wavelength band to be compensated may be a wavelength band of approximately 5 µm to approximately 15 µm.

In accordance with another exemplary embodiment, an apparatus for processing a substrate includes a heating housing configured to receive a plurality of heating lamps therein, a process chamber configured to comprising a space in which the substrate is processed by radiant energy of the heating lamps, a humidity sensor disposed in the process chamber so as to measure a humidity value in the process chamber, a pyrometer in which, assuming that a wavelength band including a transmittance limiting wavelength band as a wavelength band having a transmittance less than a first threshold value due to the humidity and a transmittance allowing wavelength band as a wavelength band having a transmittance more than a second threshold value due to the humidity is a wavelength band to be compensated, a non-contact temperature is calculated by adding a temperature compensation value corresponding to a humidity value detected by the humidity sensor to a temperature to be compensated calculated by measuring a wavelength intensity of the wavelength band to be compensated radiated from the substrate, and a heating controller configured to control the heating lamps using the non-contact temperature calculated by the pyrometer.

The process chamber may include a substrate supporting part configured to support the substrate, and a process kit configured to cover the substrate supporting part and including a substrate gate, and the humidity sensor may measure the humidity value between the substrate supported by the substrate supporting part and the pyrometer disposed at a lower side of the substrate.

In accordance with yet another exemplary embodiment, a method of detecting a temperature includes generating a temperature compensation database storing a temperature compensation value for each humidity value; assuming that a wavelength band including a transmittance limiting wavelength band as a wavelength band having a transmittance less than a first threshold value due to the humidity and a transmittance allowing wavelength band as a wavelength band having a transmittance more than a second threshold value due to the humidity is a wavelength band to be compensated, measuring a wavelength intensity of the wavelength band to be compensated out of a wavelength band radiated from an object to be measured, and calculating a temperature to be compensated; measuring a humidity value in an area to which the wavelength band is radiated; extracting a temperature compensation value corresponding to the measure humidity value from the temperature compensation database; and calculating a non-temperature by adding the temperature compensation value to the temperature to be compensated.

The generating of the temperature compensation database may include calculating a transmittance allowing temperature by detecting and converting a wavelength intensity of the transmittance allowing wavelength band out of the wavelength band radiated from the object to be measured, calculating a temperature to be compensated by detecting and converting a wavelength intensity of the wavelength band to be compensated out of the wavelength band radiated from the object to be measured, calculating a difference value as a temperature compensation value between the transmittance allowing temperature and the temperature to be compensated, and repeating the calculating of the transmittance allowing temperature, the calculating the temperature to be compensated, and the calculating the temperature compensation value, while the humidity value is changed, and storing the temperature compensation value for each humidity value in the temperature compensation database.

BRIEF DESCRIPTION OF THE DRAWINGS

Exemplary embodiments can be understood in more detail from the following description taken in conjunction with the accompanying drawings, in which:

FIG. 7 is a flow chart illustrating a process of detecting a temperature using a pyrometer in accordance with the exemplary embodiment.

DETAILED DESCRIPTION OF EMBODIMENTS

Figure 1:
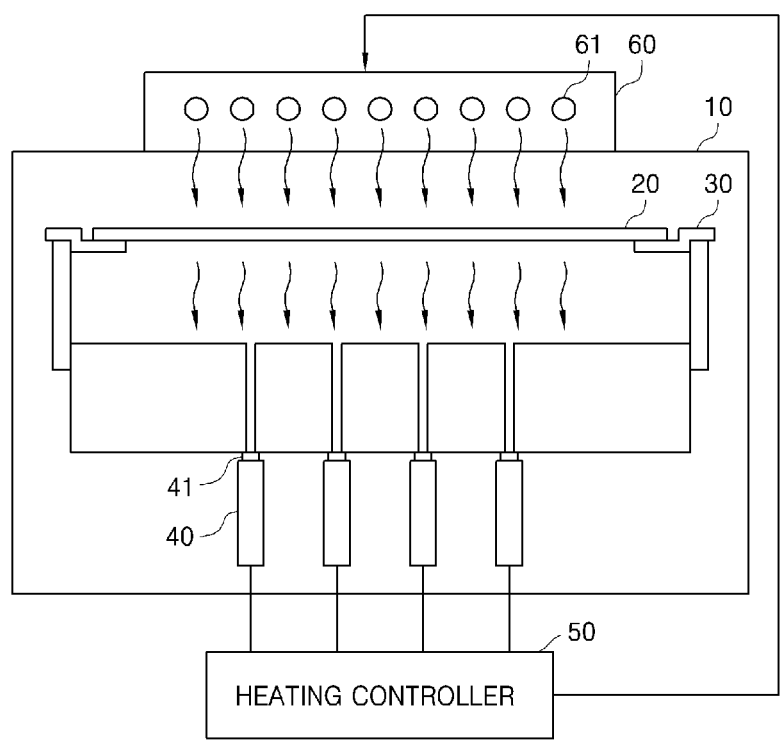
FIG. 1 is a schematic view illustrating a low temperature heat treatment apparatus.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, like reference numerals refer to like elements throughout.

Hereinafter, an example which compensates a temperature of a substrate will be described. However, the present invention may be also applied to other examples which compensate the temperature of various objects used in various industries.

Figure 3:
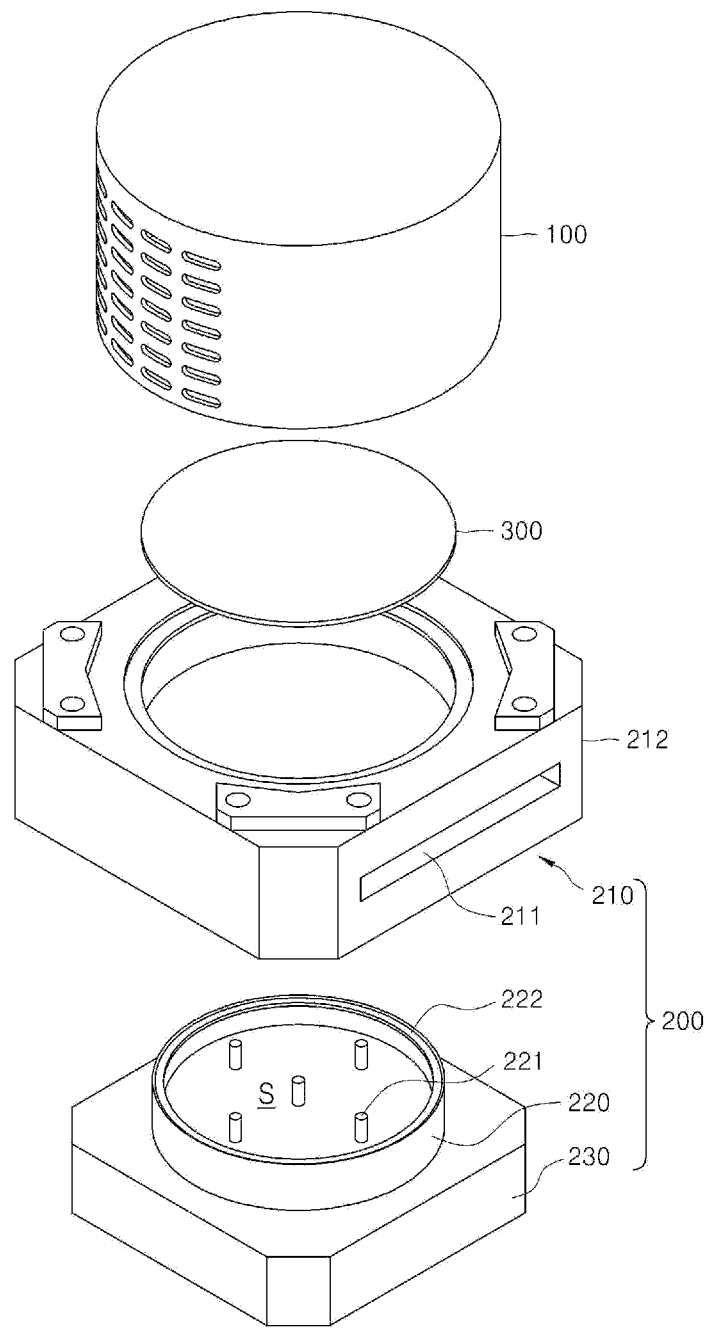
FIG. 3 is an exploded perspective view of an apparatus for processing a substrate, which includes a heating housing and a process chamber and performs a heat treatment in accordance with an exemplary embodiment.
Figure 4:
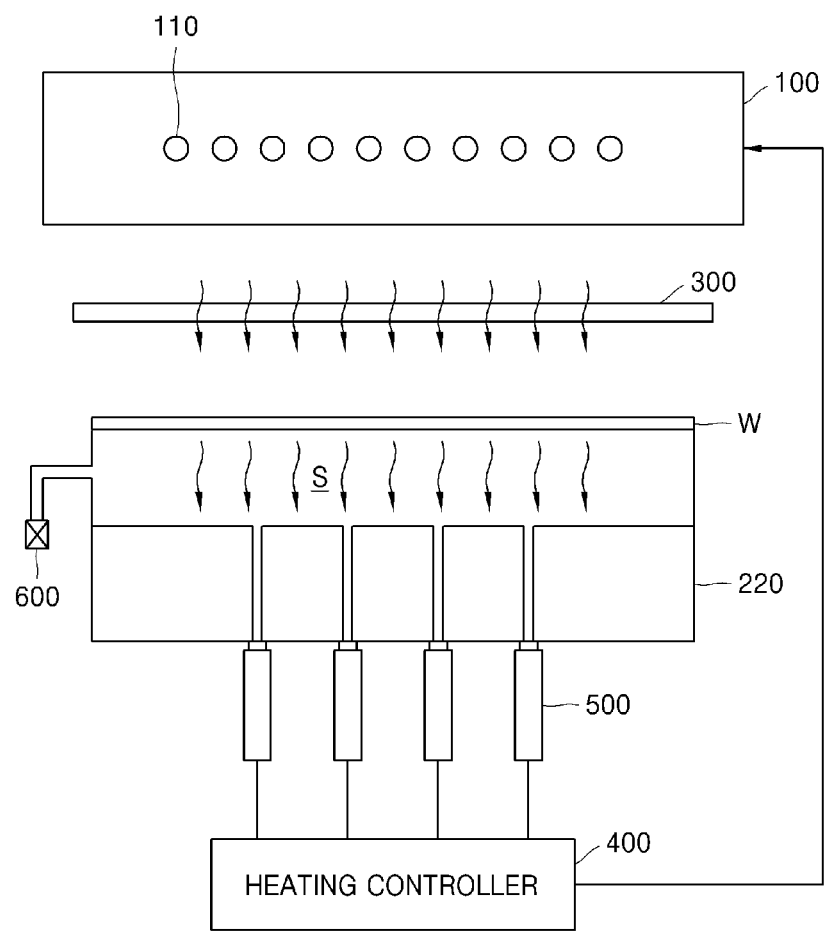
FIG. 4 is a functional block diagram illustrating a temperature measurement and a heat treatment in the apparatus for processing the substrate, which includes the heating housing and the process chamber in accordance with the exemplary embodiment.

FIG. 3 is an exploded perspective view of an apparatus for processing a substrate, which includes a heating housing and a process chamber and performs a heat treatment in accordance with an exemplary embodiment, and FIG. 4 is a functional block diagram illustrating a temperature measurement and a heat treatment in the apparatus for processing the substrate, which includes the heating housing and the process chamber in accordance with the exemplary embodiment.

Hereinafter, as an example, a heat treatment apparatus which performs a heat treatment process will be described. However, the present invention may be also applied to another apparatus for processing a substrate, which performs another various processes other than the heat treatment.

In a heat treatment apparatus, energy radiated from a heating lamp or the like is directly absorbed to a substrate, and thus the substrate is rapidly heated, whereby the heat treatment is carried out.

The heat treatment apparatus includes a heating housing 100 receiving a plurality of heating lamps 110 therein, a process chamber 200 having a space in which the substrate is processed by radiant energy of the heating lamps 110, a humidity sensor 600 disposed in the process chamber so as to measure an internal humidity of the process chamber, a pyrometer 500 in which, assuming that a wavelength band including a transmittance limiting wavelength band as a wavelength band having a transmittance less than a first threshold value due to the humidity and a transmittance allowing wavelength band as a wavelength band having a transmittance more than a second threshold value due to the humidity is a wavelength band to be compensated, a non-contact temperature is calculated by adding a temperature compensation value corresponding to a humidity value detected by the humidity sensor 600 to a temperature to be compensated calculated by measuring a wavelength intensity of the wavelength band to be compensated radiated from a substrate W, and a heating controller 500 controlling the heating lamps 110 using the non-contact temperature calculated by the pyrometer 500. Although not illustrated, the heat treatment apparatus may further include a pressure controller controlling an internal pressure of the process chamber 200. By the pressure controller, the process chamber 200 may be in a high vacuum.

The heating housing 100 receives the plurality of heating lamps 110 generating the radiant energy. The radiant energy appears in the form of light generated from the heating ramps 110, and the substrate is heated by the radiant energy of radiant heat generated from the heating lamps 110.

The heating lamps 110 are arranged in a bulb type or a linear type in a plurality of radial zones. The heating lamps 110 are embodied by halogen tungsten lamps or arc lamps, and radiate the energy in the form of near-infrared rays. Each of the heating lamps 110 has a hollow tubular shape, and thus when the heating lamps 110 are embodied by the halogen tungsten lamps, a filament generating the radiant energy is provided in each of them. A body of each of the lamps is made of glass or quartz, and thus the radiant energy of the radiant heat may be transmitted without loss. It is effective to fill each of the heating lamps with an inert gas (for example, argon).

The process chamber 200 has an internal space as a heat treatment space, and the substrate of which the temperature is measured is installed in the heat treatment space.

The heat treatment space has a circular or quadrangular container shape, but is not limited thereto, and may have various container shapes. That is, the heat treatment space may have a circular or polygonal container shape. A substrate gate 211 for allowing entry and exit of the substrate is provided at both of one side surface and the other side surface of the process chamber 200, and one of the substrate gates 211 is connected with a transporting module (not shown). For reference, the substrate may be various objects such as a silicon wafer, a polymer substrate and a glass substrate, and when using a large-sized substrate like the glass substrate, a size of the process chamber 200 becomes larger.

The process chamber 200 includes a substrate supporting part 220 having an edge ring 222 supporting the substrate, a base part 230 supporting the substrate supporting part 220, and a process kit 210 covering the substrate supporting part 220.

The substrate supporting part 220 has a plurality of lift pins 221 which are disposed therein so as to be moved in a vertical direction. The edge ring 222 is a positioning unit which may position the substrate at a position opposite to the heating housing 100 in the heat treatment space. In order to uniformly heat-treat the substrate, the substrate is adapted to be supported by the substrate supporting part 220 and to be rotated by a driving motor. The process kit 210 is disposed around the substrate supporting part 220. Therefore, when performing a heat treatment process is carried out, the substrate supporting part 220 is located in the process kit 210, and the substrate positioned at the edge ring 222 by rotation of the substrate supporting part 220 is rotated at a predetermined speed. Further, a condensing lens (not shown) of the pyrometer is disposed on a bottom surface in the substrate supporting part 220 so as to measure a wavelength penetrating the substrate. Furthermore, the substrate supporting part 220 may support the substrate in various manners, such as a pin type, other than the edge ring 222.

The base part 230 is a housing which supports the substrate supporting part 220. A shaft (not shown) supporting the substrate supporting part 220 passes through the base part 230 and is rotated by an external motor (not shown), and thus the substrate supporting part 220 is rotated.

The process kit 210 includes a quartz cylinder 212 covering the substrate supporting part 220, and the substrate gate 211 provided at the one side surface and/or the other side surface of the process kit 210 so as to allow the entry and exit of the substrate. And one of the substrate gates 211 is connected with the transporting module (not shown). The substrate W is installed through the substrate gate 211 of the process kit 210 and then disposed at the edge ring 222 of the substrate supporting part 220. For reference, when the substrate is installed in the process kit, the substrate is introduced in a state in which the lift pins 221 are lifted up, disposed on the lift pins 221 and then disposed at the edge ring 222 by lifting down of the lift pins 221. On the contrary to this, when the substrate is discharged, the lift pins 221 are lifted up so as to move up the substrate from the edge ring 222, and then the substrate is discharged to an outside through the substrate gate 211.

A window 300 is provided between the heating housing 100 and the process kit 21, and heat energy radiated from the heating lamps is transferred to the substrate through the window 300. The window 300 serves to maintain airtightness between the heating housing 100 and the process kit 210, block between the heating housing 100 and the process kit 210, and thus protect the process chamber from an external environment (e.g., gas and contaminants). Further, the window 300 serves to protect the heating lamps 110, and prevent by-products generated by heat generated from the heating lamps 110 from falling down on the substrate. The window 300 may be made of transmissive quartz. However, various transmissive materials other than the quartz may be also used.

The heating controller 400 controls the heating lamps 110 in a feedback manner using a non-contact temperature compensated and calculated in the pyrometer 500. Therefore, when the non-contact temperature compensated and calculated in the pyrometer 500 is higher than a preset temperature, a quantity of light of the heating lamps 110 is controlled to be reduced, and when the non-contact temperature compensated and calculated in the pyrometer 500 is lower than a preset temperature, a quantity of light of the heating lamps 110 is controlled to be increased.

The humidity sensor 600 measures the internal humidity of the process chamber 200. The humidity sensor 600 measures the humidity of a space S inside the substrate supporting part 220 of the process chamber 200, i.e., the space S between the substrate W supported by the edge ring 222 of the substrate supporting part 220 and the bottom surface inside the substrate supporting part 220. Therefore, the humidity sensor 600 measures the humidity of the internal space S of the process chamber 200 between the pyrometer 500 concentrating the wavelength on the bottom surface in the substrate supporting part 220 and the substrate supporting by the edge ring 222. The humidity sensor 600 may be provided in singular or plural. Further, in order to measure the humidity of the space S between the pyrometer 500 and the substrate W, as illustrated in FIG. 4, the humidity sensor 600 disposed at an outside may measure the humidity through a tube passing through the substrate supporting part 220. Furthermore, the humidity sensor 600 may be disposed at a position, which passes through the substrate supporting part 220 and receives the humidity of the space S, so as to measure the humidity.

Figure 2:
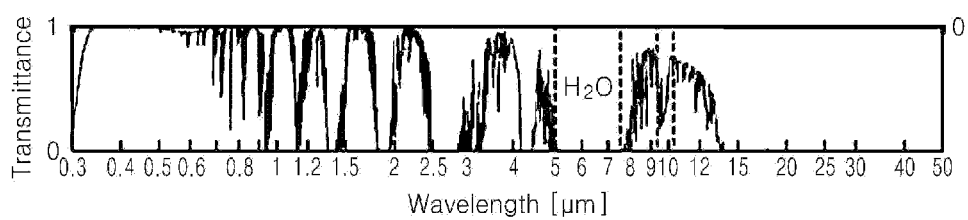
FIG. 2 is a graph illustrating a state in which a transmittance is affected by moisture according to a wavelength band.

As illustrated in FIG. 2, the transmittance of the wavelength is changed according a particular wavelength band. Particularly, in case of a wavelength band of approximately 5 μm to approximately 15 μm, the transmittance is close to '0', and thus an intensity of the wavelength measured by the pyrometer is changed. For example, in case of the pyrometer which measures the long wavelength of approximately 5 μm to approximately 15 μm, a measured quantity in a wavelength band of approximately 5 μm to approximately 7 μm may be changed according to the humidity, and thus a whole measured quantity in the wavelength of approximately 5 μm to approximately 15 μm may be also changed.

In the exemplary embodiment, in order to improve an error in the temperature measurement according to the humidity, the humidity of the space S between the substrate and the pyrometer is measured and the temperature is compensated according to the measured humidity, whereby it is possible to precisely measure the temperature.

Before describing temperature compensation database, the transmittance allowing wavelength band, the transmittance limiting wavelength band and the wavelength band to be compensated will be defined.

The transmittance limiting wavelength band means a wavelength band having the transmittance less than the first threshold value due to the humidity. For example, if the first threshold value is a transmittance of 10%, it means a wavelength band having a transmittance of 10% or less due to the humidity. That is, if a wavelength having an intensity of '100' is radiated from the substrate, the wavelength detected to have an intensity of '10' or less due to the humidity around the substrate is the transmittance limiting wavelength band. For reference, the humidity means a humidity environment of 100%. For example, in the humidity environment of 100%, when the wavelength band of approximately 5 μm to approximately 7 μm has a transmittance of 10% or less, the wavelength band of approximately 5 μm to approximately 7 μm may be decided as the transmittance limiting wavelength band. Here, the wavelength band of approximately 5 μm to approximately 7 μm means a wavelength band which is greater than a wavelength of approximately 5 μm and less than or the same as a wavelength of approximately 7 μm. Further, when the wavelength band of approximately 5 μm to approximately 7 μm has a transmittance of 10% or more, but the wavelength band of approximately 5 μm to approximately 6 μm has a transmittance of 10% or less, the wavelength band of approximately 5 μm to approximately 6 μm may be decided as the transmittance limiting wavelength band.

The transmittance allowing wavelength band means the wavelength band having the transmittance more than the second threshold value due to the humidity. For example, if the second threshold value is a transmittance of 90%, it means a wavelength band having a transmittance of 90% or more due to the humidity. That is, if a wavelength having an intensity of '100' is radiated from the substrate, the wavelength detected to have an intensity of '90' or more due to the humidity around the substrate is the transmittance allowing wavelength band. For example, in the humidity environment of 100%, when the wavelength band of approximately 7 μm to approximately 15 μm has a transmittance of 90% or more, the wavelength band of approximately 7 μm to approximately 15 μm may be decided as the transmittance allowing wavelength band. Here, the wavelength band of approximately 7 μm to approximately 15 μm means a wavelength band which is greater than a wavelength of approximately 7 μm and less than or the same as a wavelength of approximately 15 μm.

And the wavelength band to be compensated means a wavelength band including the transmittance limiting wavelength band and the transmittance allowing wavelength band. For example, when the transmittance limiting wavelength band is approximately 5 μm to approximately 7 μm and the transmittance allowing wavelength band is approximately 7 μm to approximately 15 μm, the wavelength band to be compensated is approximately 5 μm to approximately 15 μm. Since the transmittance allowing wavelength band of approximately 7 μm to approximately 15 μm is transmitted to the second threshold value (90%) or more, a measured temperature value may be relative correct, but since the transmittance limiting wavelength band of approximately 5 μm to approximately 7 μm is transmitted to the first threshold value (10%) or less, an error may occurs in the measured temperature value. Therefore, when the temperature is measured with respect to the whole wavelength band of approximately 5 μm to approximately 15 μm, the measurement error may occur due to the wavelength band of approximately 5 μm to approximately 7 μn. Therefore, when the temperature is measured with respect to the wavelength band of approximately 5 μm to approximately 15 μm, it is necessary to compensate the measure temperature, and thus the wavelength band of approximately 5 μm to approximately 15 μm including the transmittance limiting wavelength band and the transmittance allowing wavelength band refers to as the wavelength band to be compensated.

A temperature compensation database (not shown) is a database which stores temperature compensation values according to the humidity. The temperature compensation database may be decided by experimental values. In the temperature compensation database, assuming that a temperature to be compensated is a temperature obtained by converting an intensity of the wavelength band to be compensated radiated from the substrate, and a transmittance allowing temperature is a temperature obtained by converting an intensity of the transmittance allowing wavelength band, a difference value between the transmittance allowing temperature and the temperature to be compensated is regarded as a temperature compensation value for each humidity value and then stored in the temperature compensation database.

Figure 5:
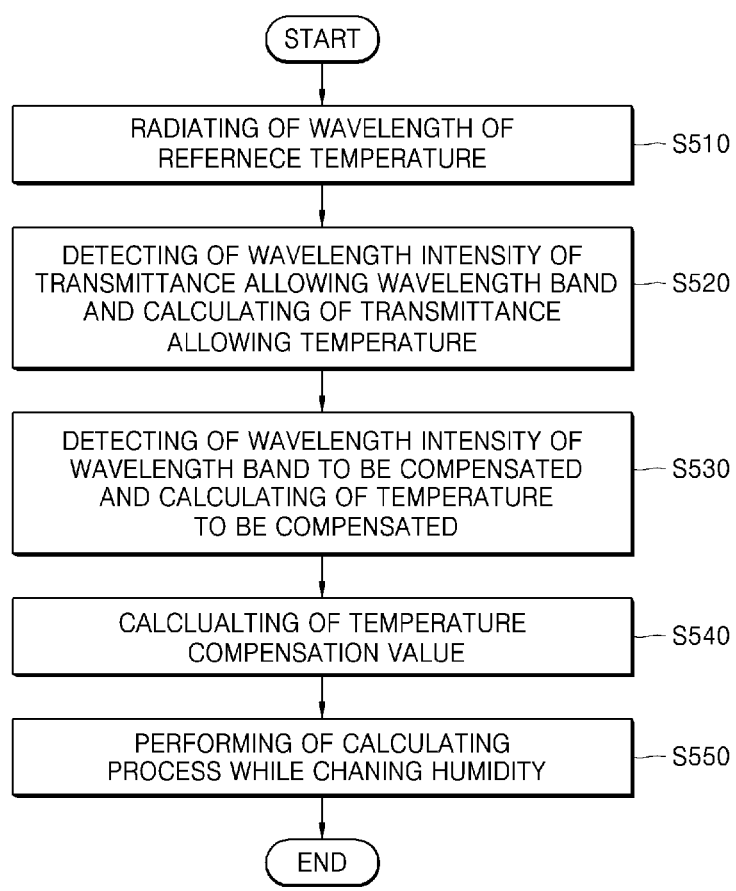
FIG. 5 is a flow chart illustrating a process of generating a temperature compensation database in accordance with the exemplary embodiment.

A process of generating a temperature compensation database will be described with reference to FIG. 5. In a space, such as a constant temperature and humidity bath, in which the humidity may be controlled, a blackbody having a preset reference temperature (e.g., approximately 600° C.) is adapted to radiate a wavelength (S510).

A wavelength intensity of the transmittance allowing wavelength band (e.g., approximately 7 μm to approximately 15 μm) is detected, and the detected wavelength intensity is converted into a temperature, and thus the transmittance allowing temperature is calculated (S520). In the same manner, a wavelength intensity of the wavelength band to be compensated (e.g., approximately 5 μm to approximately 15 μm) is detected, and the detected wavelength intensity is converted into a temperature, and thus the temperature to be compensated is calculated (S530). Then, the difference value between the transmittance allowing temperature and the temperature to be compensated is calculated as the temperature compensation value for each humidity value (S540). And while changing the humidity, a process of calculating the transmittance allowing temperature, a process of calculating the temperature to be compensated and a process of calculating the temperature compensation value are repeated, and then the calculated values for each humidity value are stored in the temperature compensation database (S550).

Figure 6:
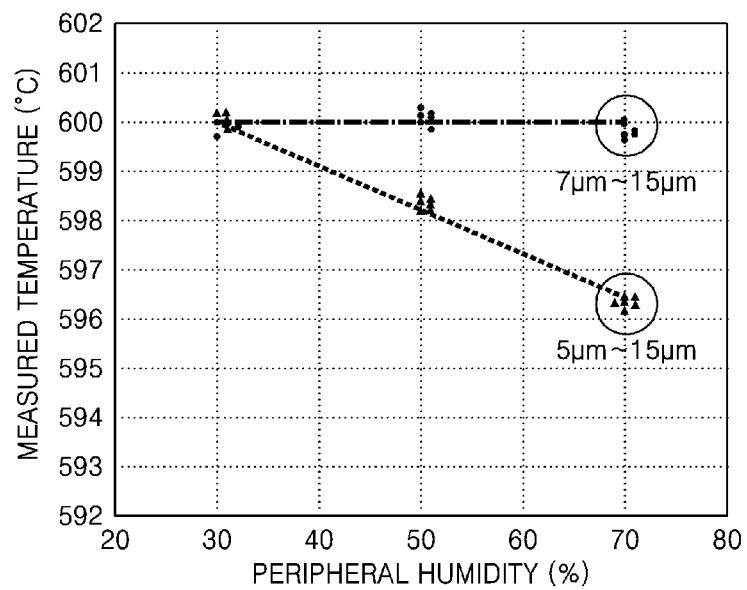
FIG. 6 is a graph illustrating a relationship between a measure wavelength and humidity in accordance with the exemplary embodiment.

Referring to FIG. 6, when the wavelength is radiated from the blackbody having the reference temperature (e.g., approximately 600° C.), the transmittance allowing temperature which is measured and converted at the transmittance allowing wavelength band (e.g., approximately 7 μm to approximately 15 μm), and the temperature to be compensated which is measured and converted at the wavelength band to be compensated (e.g., approximately 5 μm to approximately 15 μm) are indicated according to each humidity value. In case of the transmittance allowing wavelength band (e.g., approximately 7 μm to approximately 15 μm), it may be understood that the radiated reference temperature (e.g., approximately 600° C.) and the transmittance allowing temperature of the transmittance allowing wavelength band (e.g., approximately 7 μm to approximately 15 μm) are not changed, even though the humidity is changed. However, in the wavelength band to be compensated (e.g., approximately 5 μm to approximately 15 μm), it may be understood that the radiated reference temperature (e.g., approximately 600° C.) and the temperature to be compensated of the wavelength band to be compensated (e.g., approximately 5 μm to approximately 15 μm) are gradually changed from humidity of 30% or more.

Therefore, the difference value between the transmittance allowing temperature of the transmittance allowing wavelength band (approximately 7 μm to approximately 15 μm) and the temperature to be compensated the wavelength band to be compensated(approximately 5 μm to approximately 15 μm) is stored as the temperature compensation value for each humidity value in the temperature compensation database. That is, a value which subtracts the temperature to be compensated from the transmittance allowing temperature measured at certain humidity is regarded as the temperature compensation value and then stored as the temperature compensation value for corresponding humidity. For example, when the humidity is 50%, the transmittance allowing temperature is 600° C. which is the reference temperature, and the temperature to be compensated is 598.3° C., and the value which subtracts the temperature to be compensated from the transmittance allowing temperature measured at certain humidity is 1.8, and thus the value of 1.8 is stored as the temperature compensation value at the humidity of 50%.

In the same manner, when the humidity is 70%, the transmittance allowing temperature is 600° C. which is the reference temperature, and the temperature to be compensated is 596.2° C., and the value which subtracts the temperature to be compensated from the transmittance allowing temperature measured at certain humidity is 3.8, and thus the value of 3.8 is stored as the temperature compensation value at the humidity of 70%.

The pyrometer 500 serves to measure the wavelength (i.e., the wavelength radiated from the substrate itself and the wavelength penetrating the pyrometer 500) radiated from the substrate W and calculate the temperature. For reference, the pyrometer is a device for measuring the wavelength, and includes a light detector and a light source. The light detector receives radiant light radiated from the substrate and reflected light irradiated from the light source to the substrate and then reflected from the substrate, and measures the wavelength through a radiant intensity and emissivity thereof. The wavelength measured by the pyrometer is converted and calculated into energy. As it is known, assuming that the energy is E, the wavelength is λ, h is Plank's constant and c is the speed of light, the conversion of wavelength into energy may be calculated by $E=(hc)/\lambda$. Therefore, the wavelength generated from the substrate heat-treated in the process chamber may be measured and then converted and calculated into substrate measuring energy. In the above equation, it may be understood that the energy and the wavelength are in inverse proportion to each other. Also, for reference, h as the Plank' constant is $6.626*10^{-34}$[J/S], and c as light speed constant is $3\times10^8$ [m/s].

In the pyrometer 500, assuming that the wavelength band to be compensated is a wavelength band including the transmittance limiting wavelength band which is influenced by the transmittance of the threshold value or more due to the humidity and the transmittance allowing wavelength band which is influenced by the transmittance of the threshold value or less due to the humidity, the temperature to be compensated calculated by measuring the wavelength intensity of the wavelength band to be compensated radiated from the substrate is compensated by the temperature compensation value corresponding to the humidity measured by the humidity sensor, whereby the non-contact temperature is calculated.

A process of compensating and detecting the temperature in the pyrometer will be described with reference to FIG. 7.

For reference, before the process of compensating the temperature in the pyrometer, the temperature compensation database which stores the temperature compensation value for each humidity value is generated (S710). Since the process of generating the temperature compensation database was already described with reference to FIG. 5, the description thereof will be omitted.

The pyrometer 500 measures the wavelength intensity of the wavelength band to be compensated out of the wavelength band radiated from the substrate and calculates the temperature to be compensated (S720). The pyrometer 500 measures wavelength intensity of the wavelength band of approximately 7 μm to approximately 15 μm to be compensated, and since the wavelength band to be compensated includes the transmittance limiting wavelength band (e.g., approximately 5 μm to approximately 7 μm) having a reduced transmittance due to the humidity, it is not possible to carry out the precise measurement. Therefore, it is necessary to perform a compensation operation according the humidity. To this end, the humidity of the internal space located at a lower side of the substrate, in which the wavelength is radiated, i.e., under the edge ring 222 of the substrate supporting part 220 is measured (S730).

The temperature compensation value corresponding to the measure humidity is extracted from the temperature compensation database (S740). For example, if the measure humidity is 70%, a value of 3.8 as the temperature compensation value is extracted from the database.

The compensation operation in which the extracted temperature compensation value is added to the temperature to be compensated is performed, and thus the con-contact temperature is finally calculated (S750). For example, if the temperature to be compensated measured at the humidity environment of 70% is 596.2° C., the con-contact temperature is finally calculated by adding the value of 3.8 as the temperature compensation value at the humidity environment of 70%.

According to the exemplary embodiment, since the temperature compensation is performed according to the humidity, it is possible to precisely measure the temperature regardless of the peripheral humidity. Further, according to the exemplary embodiment, since the temperature compensation is performed according to the humidity, the pyrometer does not need to have a large size in order to concentrate the whole long wavelength band, and thus it is possible to minimize the corresponding equipment. Furthermore, according to the exemplary embodiment, it is possible to precisely control the temperature of the heating lamp without any effect by the humidity.

Although the apparatus and method of detecting the temperature and the apparatus for processing the substrate using the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An apparatus for detecting a temperature, comprising:
  a humidity sensor configured to measure a humidity value;
  a temperature compensation database configured to store a temperature compensation value for each humidity value; and
  a pyrometer configured to provide a non-contact temperature calculated by adding a temperature compensation value corresponding to a humidity value detected by the humidity sensor to a temperature to be compensated, where the temperature to be compensated is obtained by converting a measured wavelength intensity of a radiation radiated from an object in a wavelength band to be compensated,
  wherein the wavelength band to be compensated of 5 μm to 15 μm includes a transmittance limiting wavelength band of 5 μm to 7 μm having a transmittance less than a first threshold value due to a humidity, and a transmittance allowing wavelength band of 7 μm to 15 μm having a transmittance more than a second threshold value due to the humidity, and
  wherein the temperature compensation value for each humidity value stored in the temperature compensation database is a difference value between the transmittance allowing temperature and the temperature to be compensated for each humidity value, assuming that a transmittance allowing temperature is a temperature obtained by converting an intensity measured in the transmittance allowing wavelength band.

2. The apparatus of claim 1, wherein the transmittance limiting wavelength band is a wavelength band having a transmittance of 10% or less at a humidity environment of 100%, and the transmittance allowing wavelength band is a wavelength band having a transmittance of 90% or more at a humidity environment of 100%.

3. An apparatus for processing a substrate, comprising:
  a heating housing configured to receive a plurality of heating lamps therein;
  a process chamber having a space in which the substrate is processed by radiant energy of the heating lamps;
  a humidity sensor disposed in the process chamber so as to measure a humidity value in the process chamber;
  a pyrometer configured to provide a non-contact temperature calculated by adding a temperature compensation value corresponding to a humidity value detected by the humidity sensor to a temperature to be compensated, where the temperature to be compensated is obtained by converting a measured wavelength intensity of a radiation radiated from an object in a wavelength band to be compensated, and
  a heating controller configured to control the heating lamps using the non-contact temperature calculated by the pyrometer,
  wherein the wavelength band to be compensated of 5 μm to 15 μm includes a transmittance limiting wavelength band of 5 μm to 7 μm having a transmittance less than a first threshold value due to a humidity, and a transmittance allowing wavelength band of 7 μm to 15 μm having a transmittance more than a second threshold value due to the humidity,
  wherein the process chamber further comprises a substrate supporting part for supporting the substrate, and
  wherein the humidity sensor measures a humidity of a space surrounded by the substrate, a wall and an internal bottom surface of the substrate supporting part.

4. The apparatus of claim 3, wherein the process chamber further comprises a process kit configured to cover the substrate supporting part and comprising a substrate gate, and
  the apparatus further comprises a window transmissive for the radiant energy, wherein the window serves to maintain airtightness between the heating housing and the process kit.

5. A method of detecting a temperature, comprising:
  generating a temperature compensation database storing a temperature compensation value for each humidity value;
  calculating a temperature to be compensated from a measured wavelength intensity of a radiation radiated from an object in a wavelength band to be compensated, wherein the wavelength band to be compensated of 5 μm to 15 μm includes a transmittance limiting wavelength band of 5 μm to 7 μm having a transmittance less than a first threshold value due to a humidity, and a transmittance allowing wavelength band of 7 μm to 15 μm having a transmittance more than a second threshold value due to the humidity;
  measuring a humidity value in an area to which the wavelength band is radiated;

extracting a temperature compensation value corresponding to the measure humidity value from the temperature compensation database; and calculating a non-temperature by adding the temperature compensation value to the temperature to be compensated wherein generating of the temperature compensation database comprises:

calculating a transmittance allowing temperature by detecting and converting the wavelength intensity in the transmittance allowing wavelength band of the wavelength band radiated from the object to be measured;

calculating the temperature to be compensated by detecting and converting the wavelength intensity in the wavelength band to be compensated of the wavelength band radiated from the object to be measured;

calculating a difference value between the transmittance allowing temperature and the temperature to be compensated as the temperature compensation value; and repeating the calculating of the transmittance allowing temperature, the calculating of the temperature to be compensated, and the calculating of the temperature compensation value, while the humidity value is changed, to store the temperature compensation value for each humidity value in the temperature compensation database.

* * * * *